(12) United States Patent
Xu

(10) Patent No.: US 10,673,859 B2
(45) Date of Patent: Jun. 2, 2020

(54) PERMISSION MANAGEMENT

(71) Applicant: International Business Machines Corporation, Armonk, NY (US)

(72) Inventor: Chun Lei Xu, Xian (CN)

(73) Assignee: International Business Machines Corporation, Armonk, NY (US)

( * ) Notice: Subject to any disclaimer, the term of this patent is extended or adjusted under 35 U.S.C. 154(b) by 255 days.

(21) Appl. No.: 15/701,822

(22) Filed: Sep. 12, 2017

(65) Prior Publication Data

US 2019/0081954 A1    Mar. 14, 2019

(51) Int. Cl.
*H04L 29/06* (2006.01)
*G06Q 40/02* (2012.01)

(52) U.S. Cl.
CPC .......... *H04L 63/102* (2013.01); *H04L 63/105* (2013.01); *H04L 63/108* (2013.01); *G06Q 40/02* (2013.01)

(58) Field of Classification Search
CPC ...... H04L 63/102; H04L 63/108; G06Q 40/02
See application file for complete search history.

(56) References Cited

U.S. PATENT DOCUMENTS

| | | | |
|---|---|---|---|
| 5,671,672 A | 9/1997 | Savva | |
| 8,621,209 B1 | 12/2013 | Johansson et al. | |
| 8,978,121 B2 | 3/2015 | Shuster | |
| 9,355,155 B1 * | 5/2016 | Cassel | G06F 16/93 |
| 9,396,319 B2 | 7/2016 | Shuart et al. | |
| 9,992,018 B1 * | 6/2018 | Tjew | H04L 9/0861 |
| 10,158,646 B1 * | 12/2018 | Desai | H04L 63/102 |
| 2010/0250628 A1 | 9/2010 | Nanavati et al. | |
| 2013/0091052 A1 * | 4/2013 | Kaperdal | G06Q 20/227 705/39 |
| 2014/0020089 A1 | 1/2014 | Perini, II | |
| 2014/0078061 A1 | 3/2014 | Simons et al. | |
| 2014/0366111 A1 | 12/2014 | Sheller et al. | |
| 2015/0169854 A1 | 6/2015 | Chang et al. | |
| 2016/0006730 A1 | 1/2016 | Chari et al. | |

(Continued)

OTHER PUBLICATIONS

Locklear et al., "Continuous Authentication with Cognition-centric Text Production and Revision Features", Dec. 29, 2014, 2014 IEEE International Joint Conference on Biometrics, DOI: 10.1109/BTAS. 2014.6996227, 8 pages.

(Continued)

*Primary Examiner* — John B King
(74) *Attorney, Agent, or Firm* — Daniel C. Housley

(57) ABSTRACT

Implementations of the present disclosure relate to methods, systems, and computer program products for permission management. In one implementation, a computer-implemented method is disclosed. In the method, a permission score may be determined for a user in response to an operation requested to a target system by the user. Whether to permit the operation may be determined based on the permission score. Here, the permission score may be determined based on an identity component of the user and at least one of following components of the user: a state component, and an environment component. In other implementations, a computer-implemented system and a computer program product for permission management are disclosed.

15 Claims, 7 Drawing Sheets

(56) References Cited

U.S. PATENT DOCUMENTS

2017/0004487 A1* 1/2017 Hagen ................ G06Q 20/4016

OTHER PUBLICATIONS

Weinshall, "Cognitive Authentication Schemes Safe Against Spyware", Proceedings of the 2006 IEEE Symposium on Security and Privacy (S&P'06), Jun. 19, 2006, DOI: 10.1109/SP.2006.10, 6 pages.

Revett et al., "Biosignals for User Authentication—Towards Cognitive Biometrics?", 2010 International Conference on Emerging Security Technologies, Oct. 14, 2010, DOI: 10.1109/EST2010.32, 6 pages.

Mell et al., "The NIST Definition of Cloud Computing", Recommendations of the National Institute of Standards and Technology, Sep. 2011, U.S. Department of Commerce, 7 pages.

\* cited by examiner

PERMISSION MANAGEMENT

BACKGROUND

The present disclosure generally relates to authorization management. Specifically, the present disclosure relates to methods, systems and products for managing permission for accessing a system.

Nowadays, the permission management is critical in almost every industry. For example, a user needs to input his/her account number, the password, or other required information so as to login to an account of a bank system. After the login, the user may be permitted to manipulate his/her account by performing operations such as transferring money, withdrawing money, and the like. For another example, an employee may be requested to use his/her badge and/or password for opening the doors of an office and performing other types of operations such as using printers, fax machines, etc. Accordingly, managing the permission to various types of operations in a system in a flexible and safe way becomes a focus.

SUMMARY

In one aspect, a computer-implemented method is disclosed. According to the method, a permission score may be determined for a user in response to an operation requested to a target system by the user. Whether to permit the operation may be determined based on the permission score. Here, the permission score may be determined based on an identity component of the user and at least one of following components of the user: a state component, and an environment component.

In another aspect, a computer-implemented system is disclosed. The computing system comprises a computer processor coupled to a computer-readable memory unit, where the memory unit comprises instructions that, when executed by the computer processor, implements a method. According to the method, a permission score may be determined for a user in response to an operation requested to a target system by the user. Whether to permit the operation may be determined based on the permission score. Here, the permission score may be determined based on an identity component of the user and at least one of following components of the user: a state component, and an environment component.

In another aspect, a computer program product is disclosed. The computer program product comprises a computer readable storage medium having program instructions embodied therewith. The program instructions is executable by an electronic device to cause the electronic device to perform actions of: determining a permission score for a user in response to an operation requested to a target system by the user; determining whether to permit the operation based on the permission score; wherein the permission score is determined based on an identity component of the user and at least one of following components of the user: a state component, and an environment component.

It is to be understood that the summary is not intended to identify key or essential features of implementations of the present disclosure, nor is it intended to be used to limit the scope of the present disclosure. Other features of the present disclosure will become easily comprehensible through the description below.

BRIEF DESCRIPTION OF THE DRAWINGS

Through the more detailed description of some embodiments of the present disclosure in the accompanying drawings, the above and other objects, features, and advantages of the present disclosure will become more apparent, wherein the same reference generally refers to the same components in the embodiments of the present disclosure.

Throughout the drawings, same or similar reference numerals may represent the same or similar elements.

DETAILED DESCRIPTION

Figure 1:
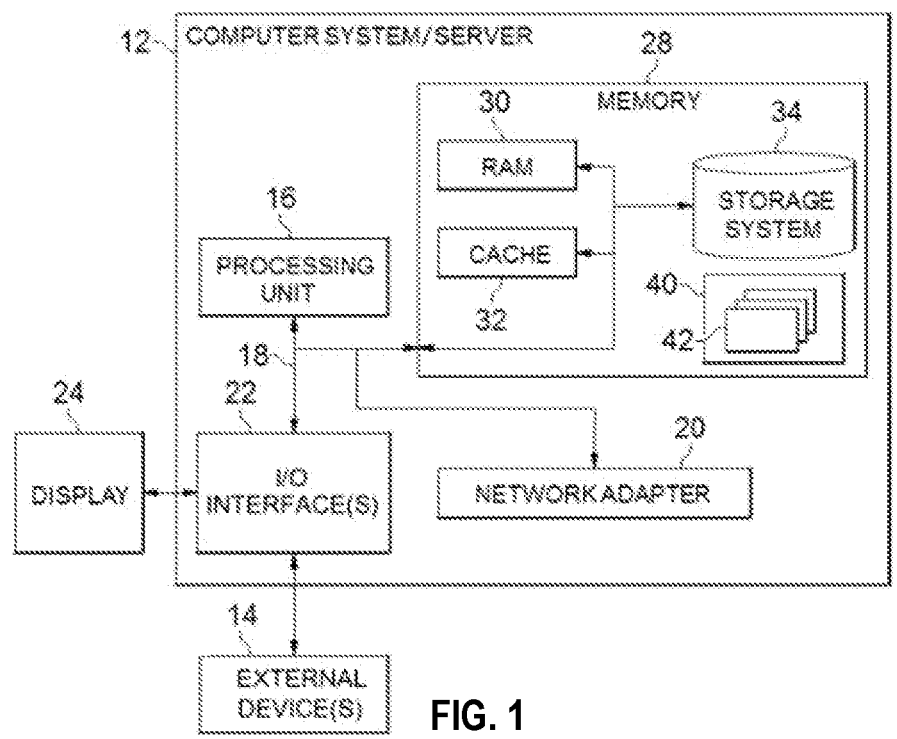
FIG. 1 depicts a cloud computing node, according to an embodiment of the present invention.

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
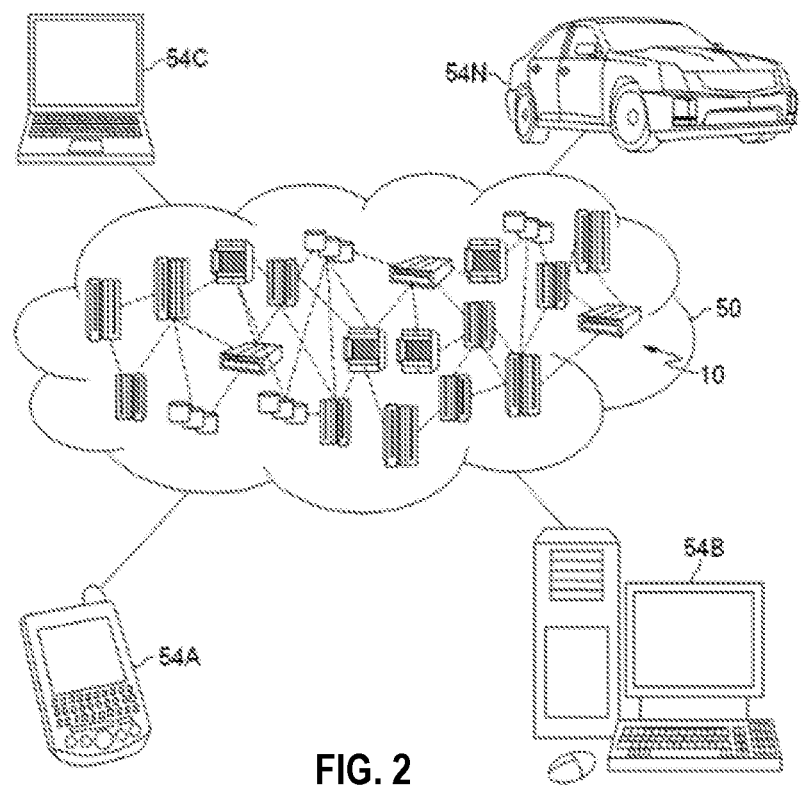
FIG. 2 depicts a cloud computing environment, according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
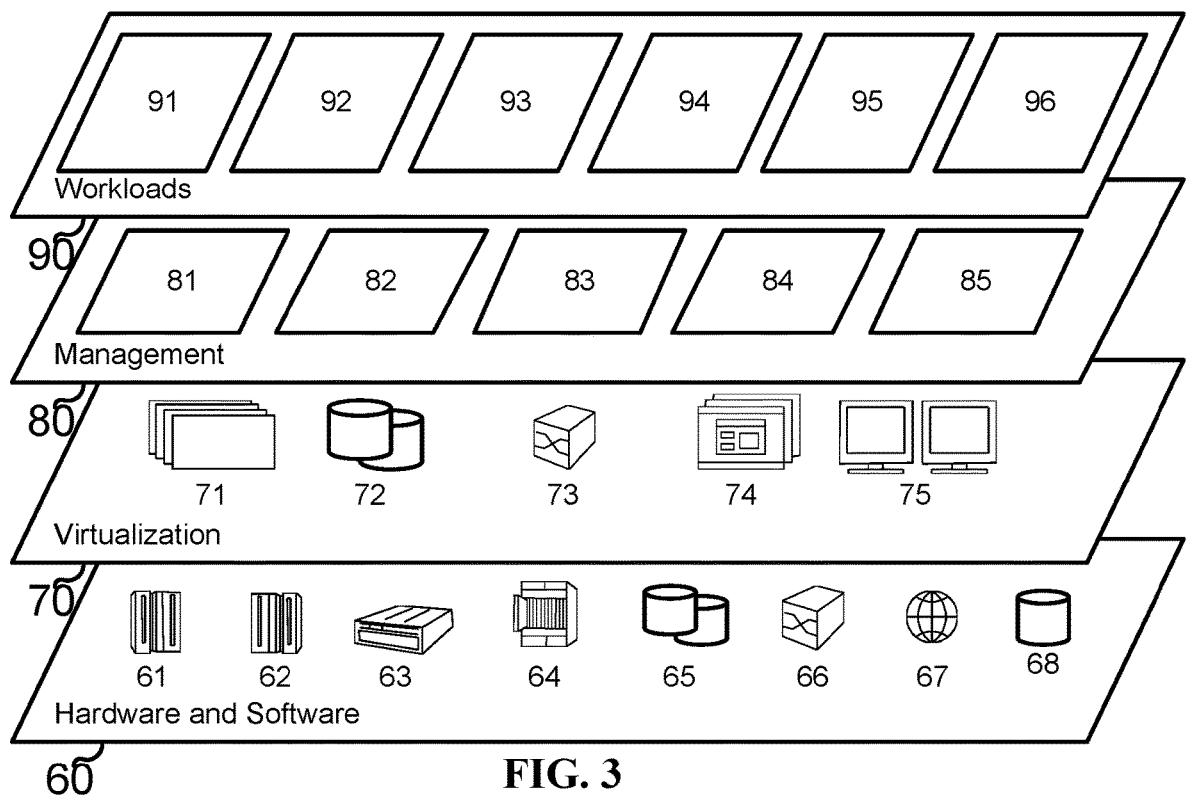
FIG. 3 depicts abstraction model layers, according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and permission processing 96. Hereinafter, reference will be made to FIGS. 4 to 10 to describe details of the permission processing 96.

Figure 4:
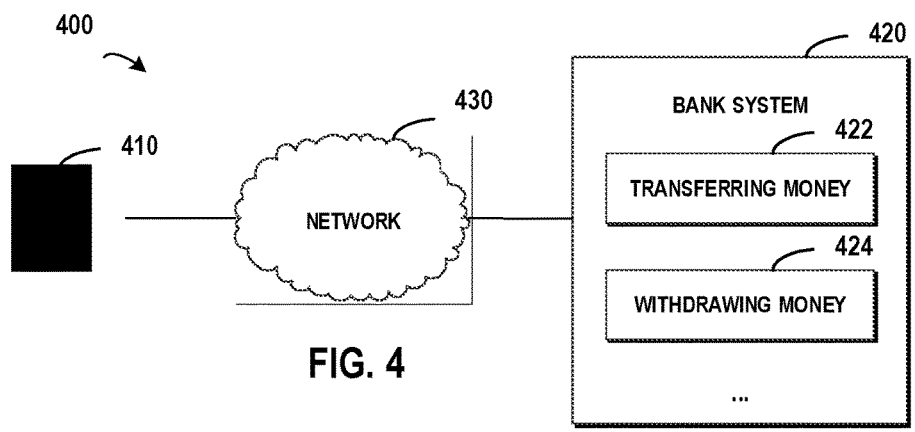
FIG. 4 depicts an example diagram for accessing a bank system.

There have been provided approaches in the field of permission management. For the sake of description, implementations of the present disclosure will be described by taking a bank system as an example of a target system that a user wants to login to. FIG. 4 depicts an example diagram 400 of a procedure for accessing a bank system 420, according to an embodiment. Usually, a user 410 is required to enter his/her account number and password before logging into the bank system 420.

Several aspects, such as identity verification, authorization, and session duration, of the current permission management may be inconvenient or not safe enough for the user 410. For example, the password for the identity verification may be leaked to others or be obtained by password attempting programs, the user 410 may be granted with excessive permission, and unexpected situations (for example, the phone by which the user 410 logins the bank system 420 may be compromised) may happen during the valid period of the login.

Further, according to the current permission management, when the person logs into the account, he/she may access, via a network 430, all the operations (such as transferring money 422, withdrawing money 424, etc.) provided in the bank system 420 without a limitation. In the worst case, all the money in the account may be lost. Referring to FIG. 4, if the network is not safe, or is controlled by a malicious person, once the user 410 inputs his/her account and password, all his/her money may be stolen by the malicious person. Therefore, managing the permissions to access a target system becomes a focus.

Figure 5A:
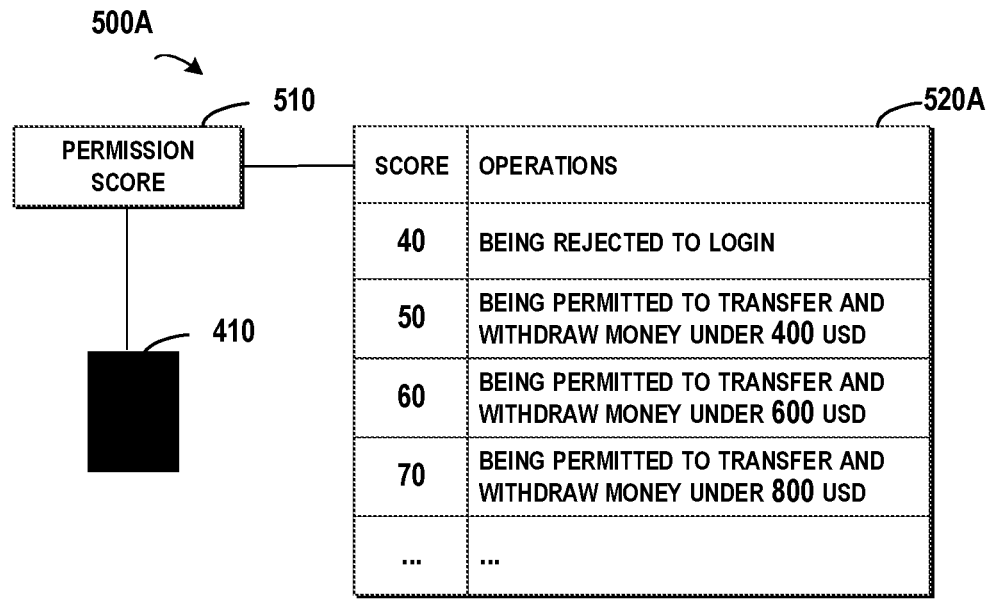
FIG. 5A depicts an example diagram of a permission score of a user associated with at least one operation provided in the target system for the user, according to one implementation of the present disclosure.
Figure 5B:
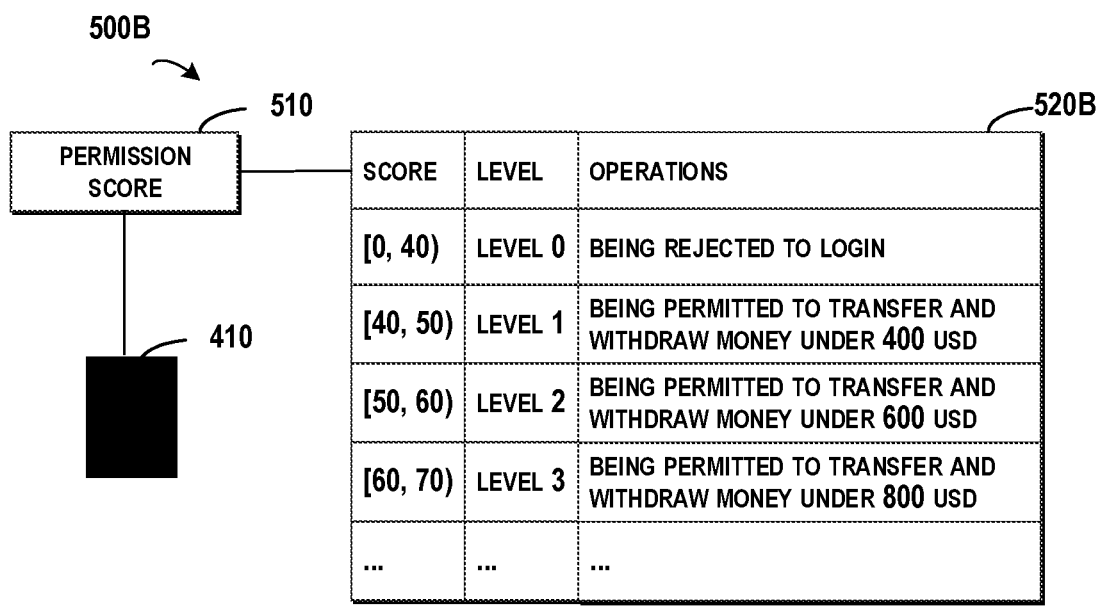
FIG. 5B depicts an example diagram of a permission level of a user associated with both at least one operation provided in the target system for the user and a permission score of the user, according to one implementation of the present disclosure.

In order to at least partially solve the above and other potential problems, a new method for managing permission is disclosed herein, according to implementations of the present disclosure. Reference will be made to FIGS. 5A and 5B for a general depiction of the present disclosure. FIG. 5A depicts an example diagram 500 of a permission score of a user associated with at least one operation provided in the target system for the user according to one implementation of the present disclosure. A permission score 510 may be determined for a user 410 in response to an operation requested to the target system by the user 410. Here, the permission score 510 may be a Continuous and Variable Score (CVS) that is determined from several aspects of the user 410. The CVS may be utilized to replace the common model of account and password, so as to provide a comprehensive way to evaluate whether the user 410 is suitable for some operations when requesting some operations provided in the target system.

It is to be understood that in the example bank system 420, there may be provided a plurality of operations. For example, the user 410 may withdraw money, transfer money to another account, exchange a foreign currency, etc. In the present implementation, based on the permission score 510, whether the user 410 is suitable for performing these operations provided in the bank system may be determined.

According to FIG. 5A, the permission score 510 may be associated with one or more permitted/forbidden operations, for example, by a mapping 520A. For example, the score in the first column of the mapping 520A may be represented by discrete values such as the integer numbers 40, 41, 42, . . . . Each of these values may be associated with one or more permitted/forbidden operations. Although FIG. 5A illustrates a one-to-multiple mapping of permitting both transferring and withdrawing money, in another example, a one-to-one/multiple-to-multiple mapping may be provided.

In addition to and/or alternatively, the score may be associated with forbidden operations. In other words, the operations associated with the score may be forbidden operations. For example, as shown in the first entry of the mapping 520A, if the score of the user 410 is below 40, then the user 410 will be rejected at login. In addition to and/or alternatively, the score may be represented by a continuous value, such as a real number within a predefined range. In addition to and/or alternatively, scores having values within a range may be associated with one or more permitted operations. For example, the score value "50" of the second entry in the mapping 520A of FIG. 5A may be modified to a range of "[40, 50)." At this point, if the score of the user 410 falls within the range of [40, 50), then the user 410 may be permitted to transfer and withdraw money under 400 USD.

Although the above paragraph shows an example of a closed range "[40, 50)," in another example, the range may be defined in an open manner. For example, the terms such as "greater than" or "less than" may be utilized. In addition to and/or alternatively, the score 510 may be mapped to the permitted operations in other manners.

Still referring to FIG. 5A, it is presupposed that the permission score 510 may range from 0 to 100, and ranges of the permission score 510 in FIG. 5A are associated with respective operations. For example, if the permission score 510 of the user 410 is below 40, then the user 410 may be rejected from logging into the bank system 420. If the permission score 510 is between 40 and 50, then the user 410 may log into the bank system 420 and perform operations, such as transferring and withdrawing money with an amount under 400 USD. If the permission score 510 is between 50 and 60, then the user 410 may log into the bank system 420 and perform operations involving an amount under 600 USD.

In one implementation of the present disclosure, a permission level may be determined based on the permission score, here the permission level may indicate the permitted/forbidden operations for the user. Whether to permit an operation may be determined based on the permission level. Reference will be made to FIG. 5B for details of the permission level.

FIG. 5B depicts an example diagram of a permission level of a user associated with both at least one operation provided in the target system for the user and a permission score of the user according to one implementation of the present disclosure. Referring to FIG. 5B, a permission level (as shown in the second column in a mapping 520B) is associated with both at least one operation provided in the target system and a range of permission score 510. Here, the permission level may be determined based on the permission score 510, the at least one permitted operation provided in the target system can be determined. Then whether to permit the requested operation can be determined based on the permission level.

Still referring to FIG. 5B, it is presupposed that the permission score 510 varies from 0 to 100, and FIG. 5B includes respective levels that are associated with both ranges of scores and at least one permitted operation provided in the target system. In FIG. 5B, if the permission score 510 of the user 410 is below 40, then Level 0 may be determined and the user 410 may be rejected from logging into the bank system 420. If the permission score 510 is between 40 and 50, then Level 1 may be determined and the user 410 may log into the bank system 420 and perform certain operations, such as transferring and withdrawing money with an amount under 400 USD. If the permission score 510 is between 50 and 60, then Level 2 may be determined and the user 410 may log into the bank system 420 and perform operations with an amount under 600 USD.

Although FIG. 5B illustrates discrete Levels 0, 1, 2, 3, . . . , in another implementations, the permission level may be represented by a continuous value within a predefined range. In one implementation of the present disclosure, the permission score 510 may be directly taken as the level, and the permitted maximum amount may be associated with the permission score 510 directly.

Compared with the normal manner for permission management, the present implementation may provide a flexible and safe way to access a target system, where the permission score 510 may be continuously determined for the user 410 according to the real time situation of the user. In turn, the permission level may be determined based on the latest permission score, such that the target system (e.g., the bank system 420 of FIG. 4) is protected in a flexible and safe manner.

Figure 6:
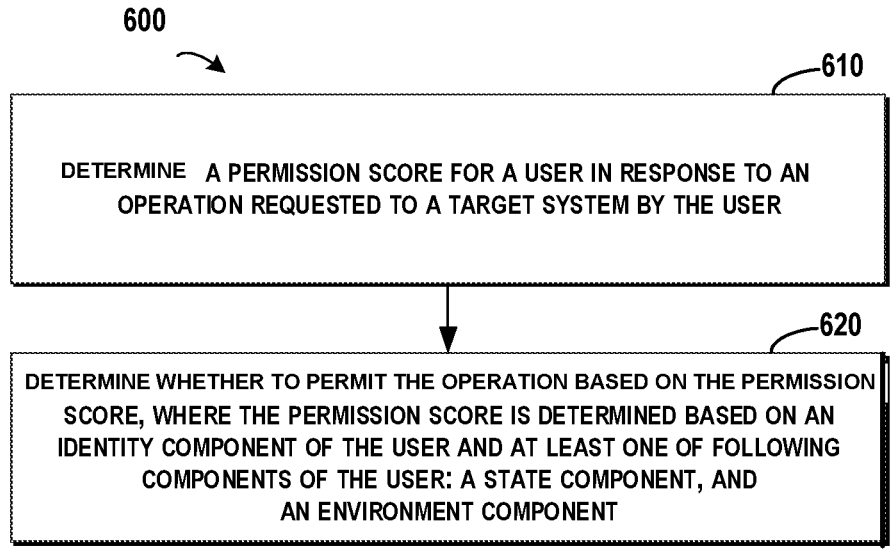
FIG. 6 depicts an example flowchart of a method for determining a permission score for a user to make operations in a target system, according to one implementation of the present disclosure.

FIG. 6 depicts an example flowchart of a method 600 for determining a permission score for a user to make operations in a target system, according to one implementation of the present disclosure. In FIG. 6, a permission score 510 may be determined 610 for a user 410 in response to an operation requested to a target system by the user at step 610. Here, the permission score 510 may reflect various aspects of a state when the user 410 is logging in the target system. The permission score 510 may be determined based on an identity component of the user and at least one of following components of the user: a state component, and an environment component. In other words, an identity of the user 410 may be a critical aspect for determining the permission score 510. Further, a state of the user 410, an environment of the user 410, and the like may also be considered. Each of the above aspects may contribute a portion of the permission score 510 and details will be described hereinafter.

As illustrated in FIG. 6, whether to permit the operation may be determined 620 based on the permission score 510 at step 620. Here, based on the decision from the permission score 510, the user 410 may be granted with a permission to the operation requested to the target system by the user 410; alternatively, the user 410 may be rejected at login. Details of each of these components may be described in the following paragraphs.

In one implementation of the present disclosure, the permission score 510 includes an identity component to indicate whether the user 410 is an authorized user for the operation. Here, in order to determine the identity component in the permission score 510, at least one identity feature may be obtained from the user 410, and the identity component may be determined based on the obtained identity feature(s).

Figure 7:
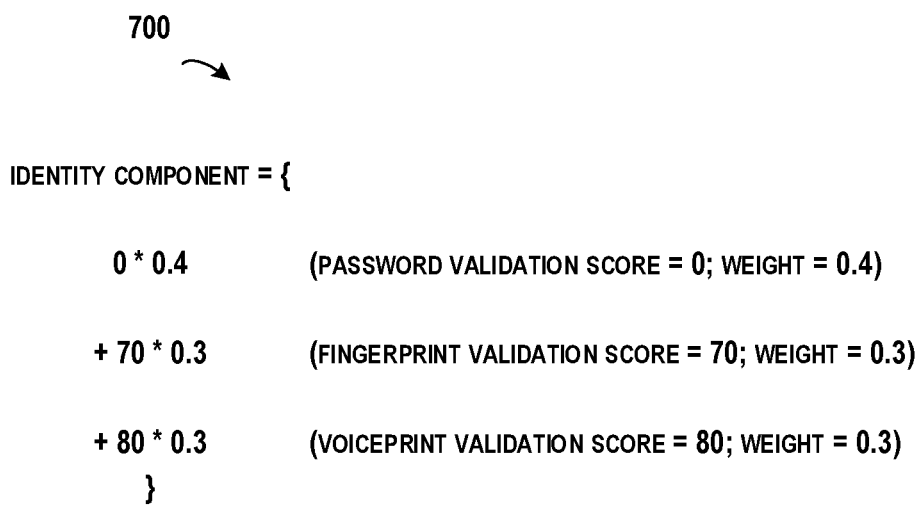
FIG. 7 depicts an example definition of an identity component in a permission score, according to one implementation of the present disclosure.

Reference will be made to FIG. 7 to describe details of how to determine the identity component included in the permission score 510. In FIG. 7, an example definition 700 is illustrated for the identity component in a permission score 510. Various identity features may be considered in determining the identity of the user 410. As illustrated in FIG. 7, the identity component may include one or more dimensions determined from any number of features, such as password validation, fingerprint validation, facial validation, and/or a voice print. Other dimensions (not pictured) may also be employed. Such dimensions may include, but are not limited to, retinal/ocular validation, biometric validation (e.g., body dimensions or ratios among body measurements), biologic validation (e.g., a user's chemical composition), etc. Each of the dimensions may be weighted by a predefined weight. For example, according to FIG. 7, results of the password validation, fingerprint validation and voiceprint validation may be weighted by 0.4, 0.3, and 0.3, respectively. In other examples, the weights may be adjusted and/or other weights may be defined for various types of validations. The identity component may be determined based on a weighted sum of the scores for the identity features as below:

$$\text{IdentityComponent} = \Sigma_1^{n1} \text{Weight}_i * \text{Score}_i \quad \text{Formula 1}$$

In the above Formula 1, IdentityComponent may represent the value of the identity component, $\text{Weight}_i$ may represent a predefined weight for the $i^{th}$ identity feature, $\text{Score}_i$ may represent the score of the $i^{th}$ identity feature, and n1 may represent the number of identity features that are monitored. Continuing the example of FIG. 7, the scores for the password, fingerprint and voiceprint validations are 0, 70, and 80, respectively, the identity component may be determined as 0*0.4+70*0.3+80*0.3=45.

There may be a situation in which when the user 410 is in a hurry or in a chaotic environment; he/she may possibly type incorrect passwords several times, and the account may be locked according to a traditional approach. However, with the above implementation of the present disclosure, several identity features are considered for a comprehensive identity value. Accordingly, even the user 410 submits incorrect passwords and does not pass the password validation, if he/she gains enough score in the fingerprint validation and voiceprint validation, the user may be permitted to log into a target system instead of being rejected.

In one implementation of the present disclosure, various identity features may be utilized in determining the identity component. For the purpose of illustration without limitation, the identity features may include any of a password, a fingerprint, a palm print, a voiceprint, a facial recognition, a retinal recognition, an iris recognition, a signature recognition, etc. In this implementation, respective scores may be determined for respective identity features, and ranges of scores for these identity features may be the same or different. In one example, if the ranges of scores are different, these different ranges may be normalized to a standard range such as from 0 to 100. It is to be understood that various algorithms that have been developed, or that will be developed in the future, may be utilized for determining these scores, and details of the algorithms will be omitted hereinafter.

Although FIG. 7 illustrates an example identity component including three dimensions, in other implementations, there may be more or fewer dimensions, and the identity feature may include a password, a fingerprint, a palm print, a voiceprint, a facial recognition, a retinal recognition, an iris recognition, a signature recognition, etc.

In one implementation of the present disclosure, the permission score 510 may further include a state component that indicates whether the user 410 is conscious enough for manipulating the account in the target system. At this point, at least one biological state of the user 410 may be obtained for indicating whether the user 410 is cognitively competent or not. Further, the state component may be determined based on at least one biological state of the user. Similar as the identity component, the state component may also include one or more dimensions. For example, one dimension of the state component may indicate one type of biological state of the user 410.

In one implementation of the present disclosure, in order to obtain the state component, at least one biological state may be collected from the user 410, and then the state component may be determined, based on the biological state(s). Various devices for collecting the biological states, such as the breath, the heartbeat, the pupil dilation, and the like, may be used to measure the user's biological state. In this implementation, the measurement for a biological state may be mapped to a score and the state component may be determined based on a weighted sum based on scores for various biological states.

In other examples, the state component may be defined in a different manner, where each dimension in the state component may indicate an incompetent state, such as drunkenness, drug overdose, or another competent/incompetent state. Taking the determination of drunkenness as an example, if a breathalyzer shows that alcohol exhaled by the user 410 exceeds a predefined threshold, then it may be determined that the user 410 is in a drunken state. In one implementation of the present disclosure, the state component may be determined based on a weight sum of the scores for the multiple competence states as below:

$$\text{StateComponent} = \Sigma_1^{n2} \text{Weight}_i * \text{Score}_i \qquad \text{Formula 2}$$

In the above Formula 2, StateComponent may represent the value of the state component, $\text{Weight}_i$ may represent a predefined weight for the $i^{th}$ competence state, $\text{Score}_i$ may represent the score of the $i^{th}$ competence state, and n2 may represent the number of competence states that are monitored. Additional rules may be defined to deal with an exception situation. The rules may define that if the drunkenness state of the user 410 reaches a certain level or the user 410 is incompetent by a drug overdose, then the user 410 may be rejected even if the permission score 510 is greater than the threshold value.

In one implementation of the present disclosure, the permission score may further include an environment component indicating a potential risk in the environment of the user 410. At this point, at least one environment feature of the environment around the user 410 may be determined, and then the environment component may be determined based on at least one environment feature of the user 410.

Similar to the identity component and the state component, the environment component may also include one or more dimensions. For example, a dimension may indicate whether a reality feature relating to a reality environment around the user 410 is safe, another dimension may indicate whether a device feature relating a device from which the user sends the request is safe, and a further dimension may indicate whether a network feature relating to a network to which the device is connected is safe.

In this implementation, a camera and/or microphone may be used to collect image and/or audio of the environment. If the user 410 is trying to log into the bank system 410 by his/her phone, then a camera equipped in the phone may be used to collect a reality feature. If it is monitored that the user 410 is in a noisy street, then the dimension relating to the reality feature may be given a low score. Otherwise, if it is monitored that the user 410 is in his/her office, then the dimension may be given a high score. Meanwhile, the safety of the device and the network may be monitored. For example, an application may be installed in the phone to monitor whether malware (such as a Trojan or another virus) is running on the phone. Further, another application may be installed to monitor whether there are impending attacks or other threats in the network. Similar to Formula 1 and Formula 2, the environment component may be determined based on a weight sum of the scores for the environment features as below:

$$\text{EnvironmentComponent} = \Sigma_1^{n3} \text{Weight}_i * \text{Score}_i \qquad \text{Formula 3}$$

In the above Formula 3, EnvironmentComponent may represent the value of the environment component, $\text{Weight}_i$ may represent a predefined weight for the $i^{th}$ environment feature, $\text{Score}_i$ may represent the score of the $i^{th}$ environment feature, and n3 may represent the number of environment features that are monitored. It is to be understood that the above Formulas 1 to 3 are just example methods for determining these components. In other implementations, other formulae, such as weighted product, may be adopted.

It is to be understood that the preceding paragraphs are only implementations of determining the permission score 510 based on the identity component, the state component and the environment of the user 410. These implementations are provided for the purpose of illustration without limitation. In other implementations of the present disclosure, other components that may indicate a safety factor of the user 410 may be utilized in determining the permission score 510. The permission score 510 may be determined based on a weight sum of the various components as below:

$$\text{PermissionScore} = \text{Weight}_i * \text{Component}_i \qquad \text{Formula 4}$$

In Formula 4, PermissionScore may represent the value of the final permission score 510, $\text{Weight}_i$ may represent a predefined weight for the $i^{th}$ component (such as the identity component, the state component, and the environment component), $\text{Component}_i$ may represent the score of the $i^{th}$ component, and n4 may represent the number of components that are used in determining the permission score 510. When the above components are utilized, the above Formula 4 may be represented as below:

$$\text{PermissionScore} = \text{Weight}_{identity} * \text{IdentityComponent} + \qquad \text{Formula 5}$$
$$\text{Weight}_{state}(\text{StateComponent} +$$
$$\text{Weight}_{environment} * \text{EnvironmentComponent}$$

In Formula 5, PermissionScore may represent the value of the final permission score 510, $\text{Weight}_{identity}$, $\text{Weight}_{state}$, and $\text{Weight}_{environment}$ may represent the weights for the identity component, the state component, and the environment component, respectively.

Figure 8A:
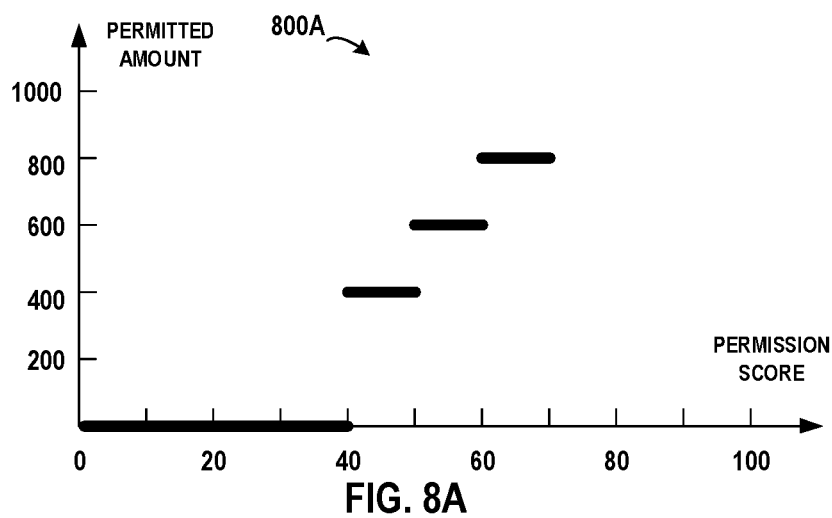
FIGS. 8A, 8B and 8C depict various example methods for determining permission scores, according to implementations of the present disclosure, respectively.
Figure 8B:
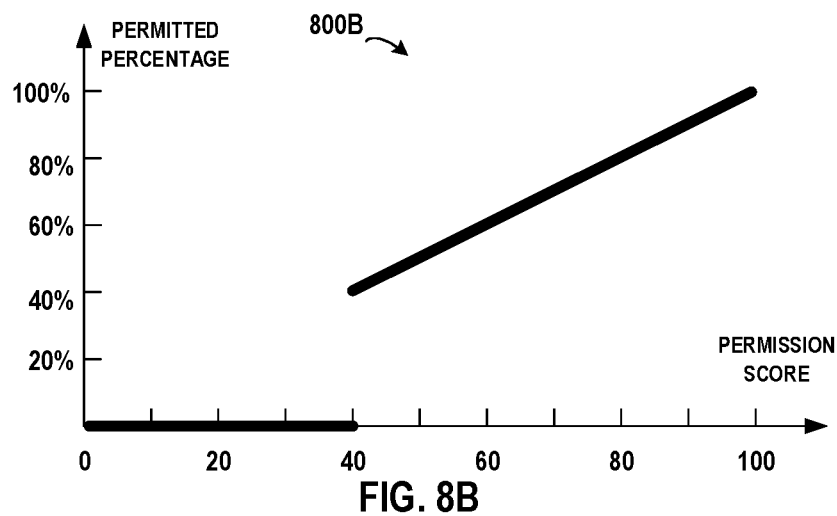
Figure 8C:
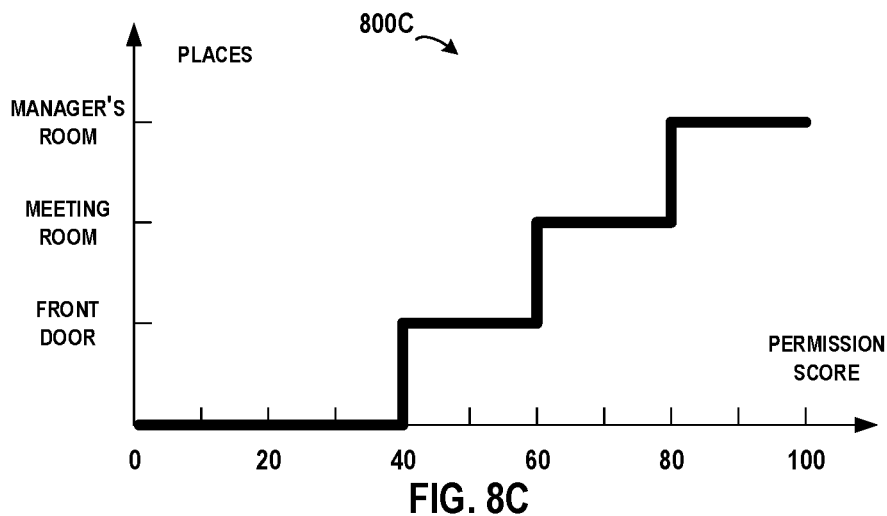

FIGS. 8A, 8B and 8C depict various example graphs for determining permission scores according to implementations of the present disclosure, respectively. FIG. 8A depicts an example of attributes for operations that are permitted to be performed in the bank system 420, where the horizontal axis may represent the permission score 510 and the vertical axis may represent the amount of money that is permitted to be manipulated in the bank system 420. If the permission score 510 falls in a range of [0, 40), then the user 410 may be rejected at login. If the permission score 510 falls in a range of [40, 50), then the user 410 may be allowed to manipulate a maximum amount of 400 USD in the bank system 420. If the permission score 510 falls in a range of [50, 60), then the user 410 may be allowed to manipulate a maximum amount of 600 USD in the bank system 420. If the permission score 510 falls in a range of [60, 70), then the user 410 may be permitted to manipulate a maximum amount of 600 USD in the bank system 420. Further, other rules may be defined.

FIG. 8A illustrates an example of discrete amounts in different permission score ranges. In other implementations, the permitted maximum amount may be represented by a continuous function. Referring to FIG. 8B, supposing the permission score 510 is within an arrange of 0 to 100, then the maximum amount of money that is permitted to manipulate may be determined as below:

$$\text{Amount}_{permitted} = \frac{\text{Score}}{100} * \text{Amount}_{total} \qquad \text{Formula 6}$$

In the above Formula 6, $\text{Amount}_{permitted}$ may represent the maximum amount of money that is permitted to manipulate by the user 410, Score may represent the permission score 510 of the user 410, and Amount$_{total}$ may represent the total amount of money in the user's account. According to Formula 6, if the permission score 510 is below 40, the user 410 may not login the bank system 420. If the permission score 510 is above or equals to 40, then the user 410 may manipulate a certain percentage of the total amount in the account. Specifically, if the permission score 510 is 40, then the user 410 may login the account and perform operations such as transferring, withdrawing, exchanging, and the like with a limit of 40% of the total amount. If the permission score 510 is 100, then the user 410 may manipulate all the money in the account.

Besides the bank system 420, the described implementations may be adopted in other target systems. Taking a security system of a company as an example, an association of the permission score and places that are permitted to access in the security system may be defined.

Referring to FIG. 8C, the horizontal axis may represent the permission score 510 and the vertical axis may represent the places that are permitted to access. If the permission score 510 falls in a range of [0, 40), then the user 410 may be rejected from entering the front door of the company. If the permission score 510 falls in a range of [40, 60), then the user 410 may be allowed to enter the front door. If the permission score 510 falls in a range of [60, 80), then the user 410 may be further allowed to enter the meeting room of the company. If the permission score 510 falls in a range of [80, 100], then the user 410 may be further permitted to enter the manager's room. It is to be understood that FIG. 8C is only an example for entering doors in the company, in other implementations, the permission model may define the manner for accessing other objects such as printers, telephones, fax machines, etc.

In an implementation of the present disclosure, a permission for performing an operation may be granted to the user based on a permission score. In other words, if the decision is to permit the requested operation, the user can be permitted to perform the operation. If the decision is to not permit the operation, the user can be forbidden from performing the operation. Then the user can be provided with tips or other messages, such as "Your network is not safe enough, the operation of transferring money above $500 is not permitted," "You may have drunk too much, the operation of transferring money above $500 is not permitted," etc.

Further, from FIGS. 8A, 8b and 8C, it can be found that the user 410 may be granted with different permissions for performing different operations in the target system. Compared with a traditional approach that fully rejects the user 410 or grants full permission to the user 410, the implementation of the present disclosure may determine an appropriate permission for the user 410 and may allow the user 410 to perform at least a portion of the operations that is reasonable for the user 410.

In one implementation of the present disclosure, the method 700 may be implemented in response to any of: an expiration of a predefined time period and a receipt of an invocation. According to this implementation, the permission score 510 may be periodically based on the expiration of a predefined time period. For example, the permission score 510 may be determined every five minutes, or according to some other time interval. In turn, the permission level may be determined according to the latest permission score 510. Alternatively, the method 700 may be performed in response to an invocation. For example, if a change in the permission score 510 reaches a predefined critical value, then the invocation may be sent. In another example, the permission score 510 may be measured in real time, and the permission level may vary according to the real time measurement.

Figure 9A:
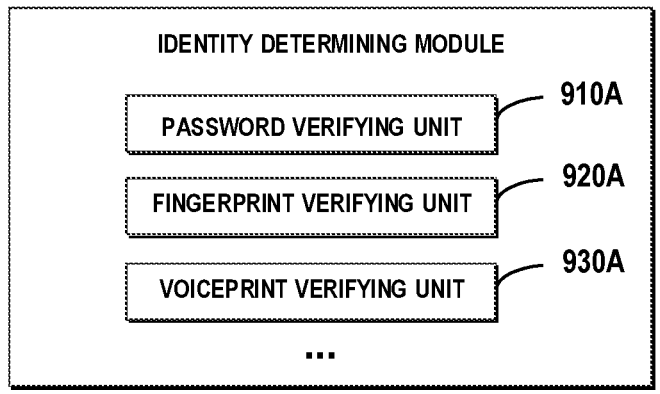
FIGS. 9A, 9B and 9C depict example modules for determining an identity component, a state component, and an environment component, respectively, according to one implementation of the present disclosure.
Figure 9B:
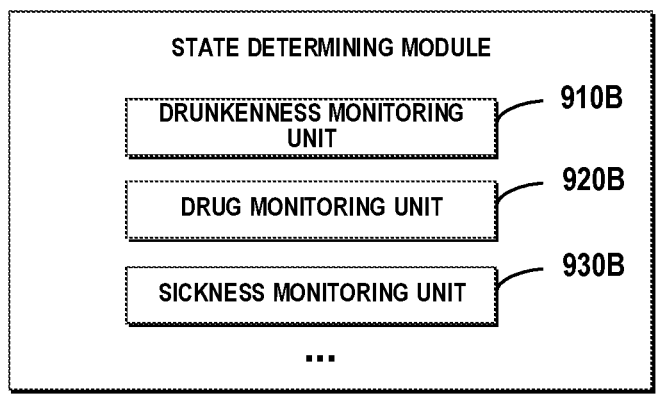
Figure 9C:
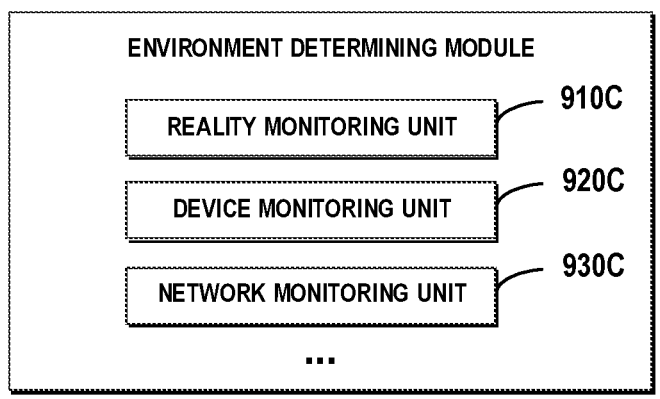

The preceding paragraphs have described various aspects of the method 700, hereinafter, example modules for implementing the method 700 are provided with reference to FIGS. 9A, 9B and 9C. FIG. 9A depicts an example identity determining module 900A for determining the identity component that is included in a permission score 510 according to implementations of the present disclosure. Here the identity determining module 900A may include/connect to units for determining various scores relating to various identity features such as a password, a fingerprint, a palm print, a voiceprint, a facial recognition, a retinal recognition, an iris recognition, and a signature recognition. Although FIGS. 9A, 9B and 9C show implementations with units being included in a determining modules 900A, 900B and 900C, those skilled in the art can understand that the units can be connected to the determining modules 900A, 900B and 900C. Further, modules 900A, 900B, and 900C, and their components, may exist, or be virtualized on, one or more devices, such as the computer system/server 12 of FIG. 1, devices 54A-54N of FIG. 2, etc.

A password verifying unit 910A may be included in/connected to the identity determining module 900A. The password verifying unit 910A may compare the password that is input from the user 410 with a reference password that is stored in, for example, a secured database. If there is a match in the comparing, the input password may be verified, otherwise the input password may be rejected.

Further, a fingerprint verifying unit 920A and a voiceprint verifying unit 930A may be included in/connected to the identity determining module 900A. Taking the fingerprint verifying unit 920A as an example, if one half of the fingerprint matches the reference fingerprint in the database while the other half does not match, then the fingerprint verifying score may be set to 50. If the whole fingerprint matches the reference fingerprint, then the fingerprint validation score may be set to 100. These units 910A, 920A, and 930A may be designed based on existing verifying solutions or solutions that are to be developed in the future. Details of the verifying solutions will be omitted to avoid confusing the subject matter of the present disclosure.

FIG. 9B depicts an example state determining module 900B for determining the state component that is included in a permission score 510, according to implementations of the present disclosure. A drunkenness monitoring unit 910B may be included in/connected to the state determining module 900B. The drunkenness monitoring unit 910B may determine whether the user 410 is drunk by monitoring the biological states such as the breath, the heartbeat, the state of the pupil, and the like. Further, the state determining module 900B may include/connect to a drug monitoring unit 920B, a sickness monitoring unit 930B, and the like. These units 910B, 920B, and 930B may be designed based on existing diagnosis solutions, or solutions that are to be developed in the future. Details of the diagnosis solutions will be omitted to avoid confusing the subject matter of the present disclosure.

FIG. 9C depicts an example environment determining module 900C for determining the environment component that is included in a permission score 510 according to implementations of the present disclosure. A reality monitoring unit 910C may be included in/connected to the environment determining module 900C. The reality monitoring unit 910B may determine whether reality environment around the user 410 is safe, based on data collected from a camera, microphone, or other types of sensors. Further, the environment determining module 900C may include a device monitoring unit 920C, a network monitoring unit 930C, and the like. These units 910C, 920C, and 930C may be designed based on existing monitoring solutions, or solutions that are to be developed in the future. Details of the monitoring solutions will be omitted to avoid confusing the subject matter of the present disclosure.

Figure 10:
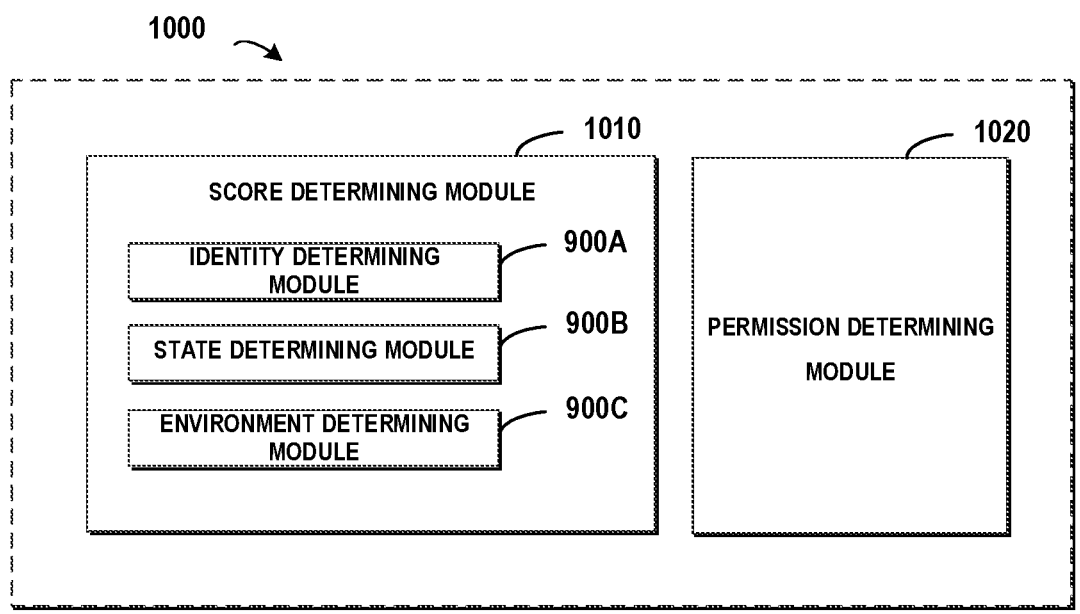
FIG. 10 depicts an example diagram of a system for determining a permission for an operation requested to a target system by a user, according to one implementation of the present disclosure.

FIG. 10 depicts an example diagram of a system 1000 for determining a permission to an operation requested to a target system by a user, according to one implementation of the present disclosure. In the system 1000, a score determining module 1010 may be provided for determining a permission score for the user 410, in response to an operation requested to a target system by the user 410. The score determining module 1010 may include the identity determining module 900A, the state determining module 900B, and the environment determining module 900C, respectively. Further, a permission determining module 1020 may be provided for determining a permission associated with an operation requested to the target system by the user 410, based on the determined permission score 510. Alternatively, the association between permission level and permission score may reside at another location as long as it may be accessed by the permission determining module 1020.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for managing permissions, the method comprising:
   determining a permission score for a user, in response to an operation requested to a target system by the user; and
   determining whether to permit the operation based on the permission score, wherein the permission score is determined based on an identity component of the user and a combination of the following components of the user:
   a state component determined by obtaining at least one dimension of the user to determine a biological state, and
   an environment component obtained by:
      obtaining at least one environment feature of the user by monitoring a combination of: a reality feature relating to a reality environment around the user, a device feature relating to a device from which the user sends the request, and a network feature relating to a network to which the device is connected; and
      determining the environment component based on the obtained at least one environment feature.

2. The method of claim 1, wherein determining whether to permit the operation based on the permission score comprises:
   determining a permission level associated with at least one operation provided in the target system for the user based on the permission score; and
   determining whether to permit the operation based on the permission level.

3. The method of claim 1, wherein the identity component is obtained by:
   obtaining at least one identity feature from the user; and
   determining the identity component based on the obtained at least one identity feature, wherein the at least one identity feature includes at least one of following features: a password, a fingerprint, a palm print, a voiceprint, a facial recognition, a retinal recognition, an iris recognition, and a signature recognition.

4. The method of claim 1, further comprising:
   permitting the user to perform a first operation, in response to a permission being determined, and
   forbidding the user from performing a second operation, in response to a rejection being determined.

5. The method of claim 4, further comprising:
   providing the user with tips, in response to forbidding the user from performing the second operation.

6. The method of claim 1, wherein the method is implemented in response to at least one of following conditions:
   an expiration of a predefined time period; and
   a receipt of an invocation.

7. The method of claim 3, wherein each identity feature is given a score, and the identity component is determined based on a weighted sum of the scores for the identity features.

8. A system for managing permissions, the system comprising a computer processor coupled to a computer-readable memory unit, the memory unit comprising instructions that when executed by the computer processor implements a method, the method comprising:
   determining a permission score for a user in response to an operation requested to a target system by the user; and
   determining whether to permit the operation based on the permission score, wherein the permission score is determined based on an identity component of the user and a combination of the following components of the user:
   a state component determined by obtaining at least one dimension of the user to determine a biological state, and
   an environment component obtained by:
      obtaining at least one environment feature of the user by monitoring a combination of: a reality feature relating to a reality environment around the user, a device feature relating to a device from which the user sends the request, and a network feature relating to a network to which the device is connected; and
      determining the environment component based on the obtained at least one environment feature.

9. The system of claim 8, wherein determining whether to permit the operation based on the permission score comprises:
   determining a permission level associated with at least one operation provided in the target system for the user based on the permission score; and
   determining whether to permit the operation based on the permission level.

10. The system of claim 8, wherein the identity component is obtained by:
    obtaining at least one identity feature from the user; and
    determining the identity component based on the obtained at least one identity feature, wherein the at least one identity feature includes at least one of following features: a password, a fingerprint, a palm print, a voiceprint, a facial recognition, a retinal recognition, an iris recognition, and a signature recognition.

11. The system of claim 8, further comprising: permitting the user to perform a first operation, in response to a permission being determined, and forbidding the user from performing a second operation, in response to a rejection being determined.

12. A computer program product, the computer program product comprising a computer readable storage medium having program instructions embodied therewith, the program instructions executable by an electronic device to cause the electronic device to perform the actions of:
  determining a permission score for a user in response to an operation requested to a target system by the user; and
  determining whether to permit the operation based on the permission score, wherein the permission score is determined based on an identity component of the user and a combination of the following components of the user:
  a state component determined by obtaining at least one dimension of the user to determine a biological state, and
  an environment component obtained by:
    obtaining at least one environment feature of the user by monitoring a combination of: a reality feature relating to a reality environment around the user, a device feature relating to a device from which the user sends the request, and a network feature relating to a network to which the device is connected; and
    determining the environment component based on the obtained at least one environment feature.

13. The computer program product of claim 12, wherein the determining whether to permit the operation based on the permission score comprises:
  determining a permission level associated with at least one operation provided in the target system for the user based on the permission score; and
  determining whether to permit the operation based on the permission level.

14. The computer program product of claim 12, wherein the identity component is obtained by:
  obtaining at least one identity feature from the user; and
  determining the identity component based on the obtained at least one identity feature, wherein the at least one identity feature includes at least one of following features: a password, a fingerprint, a palm print, a voiceprint, a facial recognition, a retinal recognition, an iris recognition, and a signature recognition.

15. The computer program product of claim 12, wherein the program instructions further cause the device to perform the actions of: permitting the user to perform a first operation, in response to a permission being determined, and forbidding the user from performing a second operation, in response to a rejection being determined.

* * * * *